United States Patent [19]

Ishida et al.

[11] Patent Number: 4,748,321

[45] Date of Patent: May 31, 1988

[54] FOCUS DETECTION DEVICE WITH WAVEFRONT ABERRATION CORRECTION

[75] Inventors: Tokuji Ishida, Daito; Masataka Hamada, Osaka, both of Japan

[73] Assignee: Minolta Camera Kabushiki Kaisha, Osaka, Japan

[21] Appl. No.: 893,101

[22] Filed: Aug. 4, 1986

[30] Foreign Application Priority Data

Aug. 5, 1985 [JP] Japan .................................. 60-172889

[51] Int. Cl.⁴ ................................................ G01J 1/20
[52] U.S. Cl. ....................................... 250/201; 354/406
[58] Field of Search ............... 250/201, 204, 208, 209; 354/406, 407, 408; 356/1, 4

[56] References Cited

U.S. PATENT DOCUMENTS

| | | | |
|---|---|---|---|
| 4,417,139 | 11/1983 | Kusaka | 250/204 |
| 4,500,778 | 2/1985 | Kusaka et al. | 250/201 |
| 4,543,476 | 9/1985 | Horikawa | 250/201 |
| 4,613,748 | 9/1986 | Imai | 250/201 |
| 4,634,851 | 1/1987 | Ogasawara et al. | 354/408 |

FOREIGN PATENT DOCUMENTS 60-32012 2/1985 Japan.
60-101514 6/1985 Japan.

*Primary Examiner*—David C. Nelms
*Attorney, Agent, or Firm*—Price, Gess & Ubell

[57] ABSTRACT

A focus detection device includes a focus adjustable objective lens for forming an image of an object, first and second image forming lenses for forming first and second images of the image of the object, and first and second image sensors for sensing the first and second images so as to generate first and second signals representative of light intensity distributions of the first and second images. A first calculating member calculates a distance between the first and second images in accordance with the first and second signals, a second calculating member for calculating an amount of deviation of the image relative to a focal plane in accordance with the distance calculated by the first calculating member. A main portion determining member determines a location of a main portion of the first image in accordance with the first signal and a correction member corrects one of the calculation results obtained by the first and second calculating members when the determination of the main portion determining member indicates that the main portion is located outside a central portion of the first image, thus lessening error due to wave front aberration.

4 Claims, 8 Drawing Sheets

FOCUS DETECTION DEVICE WITH WAVEFRONT ABERRATION CORRECTION

BACKGROUND OF THE INVENTION

The present invention relates to a focus detection device in which an image of a target object formed by an objective lens is re-formed, by first and second image forming lenses disposed symmetrically with respect to the optical axis of the objective lens, into first and second optical images on first and second detection means for detecting the first and second optical images, respectively a distance between the first and second optical images is calculated on the basis of illuminance distributions of the first and second optical images detected by the first and second detection means, respectively such that focus condition of the objective lens relative to the target object, and especially the amount of deviation (defocus amount) of the image of the target object from a predetermined image forming plane is detected from the distance between the first and second optical images.

Conventionally, with focus detection devices of this kind, since the first and second optical images are to be formed by light fluxes having passed through the exit pupil of the objective lens and the first and second image forming lenses, it has been a general practice to provide a condenser lens adjacent to the predetermined image forming plane of the objective lens and forwardly of the first and second image forming lenses such that effective apertures of the first and second image forming lenses are projected within the exit pupil of the objective lens. FIGS. 1 and 2 show an optical system of a prior art focus detection device of this kind and formation of images therein, respectively. The known optical system includes an objective lens 2, a predetermined focal plane 4 positioned rearwardly of the objective lens 2 and a condenser lens 6 positioned rearwardly of the predetermined focal plane 4. The condenser lens 6 is constituted by a spherical lens. Furthermore, the known optical system includes a pair of image forming lenses 8 and 10 positioned rearwardly of the condenser lens 6 and a pair of line sensors 12 and 14 positioned at image forming planes of the image forming lenses 8 and 10, respectively. Each of the line sensors 12 and 14 has a charge coupled device (CCD) used as a photo-sensor array. First and second images of a target object are, respectively, formed on the line sensors 12 and 14. As shown in FIG. 2, these images come close to an optical axis 18 in a front focus condition in which an image of a target object to be focused is formed forwardly of the predetermined focal plane 4. On the contrary, the images are spaced away from the optical axis 18 in a rear focus condition in which the image of the target object is formed rearwardly of the predetermined focal plane 4. In an in-focus condition in which the image of the target object is formed on the predetermined focal plane 4, a distance between corresponding points of the two images is set to a specific distance determined by design conditions of the optical system. Therefore, in principle, the focus condition of the optical system can be detected by measuring the distance between the two images.

However, it should be noted here that wave front aberration, especially distortion produced due to deviation of the optical axis of the first and second image forming lenses 8 and 10 from the the optical axis of the condenser lens 6, i.e. the optical axis 18 of the objective lens 2 acting as the primary optical axis of the focus detection optical system exerts different influences on corresponding portions of the first and second images symmetrically with respect to the optical axis 18. Thus, it is difficult to accurately detect the distance between the first and second images.

More specifically, FIG. 3a shows illuminance distribution of the first and second images on the line sensors 12 and 14 in the case where a dark slit image is formed, on the predetermined image forming plane 4, in alignment with the primary optical axis 18. On the other hand, FIGS. 3b and 3c show illuminance distribution of the first and second images in the case where a dark slit image is formed, on the predetermined image forming plane 4, at positions spaced a distance ΔD upwardly and downwardly from the optical axis 18, respectively. In FIGS. 3a to 3c, a distance between the first and second images is represented by D1, D2 and D3, respectively. Essentially, the distances D1, D2 and D3 should be identical with each other. However, as a matter of fact, the distance D1 becomes larger than the distances D2 and D3 equal to each other by the above described influence of wave front aberration, especially distortion produced due to deviation of the optical axis of the first and second image forming lenses 8 and 10 from the optical axis of the condenser lens 6. Furthermore, if the distance ΔD is increased, the distances D2 and D3 are reduced accordingly as shown by the solid line A in FIG. 4. Namely, even when the dark slit image is likewise formed on the predetermined image forming plane 4 as in the case of FIGS. 3a to 3c, the distance between the first and second images decreases gradually as the dark slit image formed on the predetermined image forming plane 4 is spaced further from the primary optical axis 18. This means that in the case where focus detection of the actual image of the target object is performed, the distance between the first and second images may vary at corresponding portions of the first and second images so as to assume different values even in an identical focus condition of the objective lens relative to the target object. Therefore, results of detection of focus condition of the objective lens relative to the target object are subject to change according to positions of main portions of the first and second images.

Japanese Patent Laid-Open Publication No. 32012/1985 has proposed an arrangement which is designed to optically restrain the above described influence of wave front aberration, especially distortion as shown by the broken line B in FIG. 4 by forming the condenser lens into an aspherical shape. However, this known arrangement has such a drawback that production cost of the aspherical condenser lens is high due to the need for manufacture of dies for the condenser lens. Furthermore, the known arrangement is disadvantageous in that sophisticated design of the aspherical lens is required to be performed in order to effectively restrain the influence of wave front aberration, thereby resulting in an expensive focus detection device.

SUMMARY OF THE INVENTION

Accordingly, an essential object of the present invention is to provide a focus detection device which obviates the above described disadvantages of conventional focus detection devices by employing a correction utilizing electrical calculation.

In order to accomplish this object of the present invention, a focus detection device of the present invention comprises: a focus adjustable objective lens for forming an image of an object; first and second image forming lenses arranged symmetrically with one another with respect to the optical axis of the objective lens for forming first and second images of the image of the object in such a manner that the distance between the first and second images in the direction perpendicular to the optical axis of the objective lens varies with the focus condition of the objective lens (the first and second images being subjected to wave front aberration); first and second image sensors for sensing the first and second images to generate first and second signals representative of the light intensity distributions of the first and second images, respectively; first calculating means for calculating the distance between the first and second images sensed by the first and second image sensors in accordance with the first and second signals; second calculating means for calculating the amount of deviation of the image of the object relative to a predetermined focal plane of the objective lens in accordance with the distance calculated by the first calculating means; main portion determining means for determining the location of a main portion of at least one of the first and second images in accordance with at least one of the first and second signals; and correction means for correcting one of the calculation results obtained by the first and second calculating means so as to lessen an error involved therein owing to the wave front aberration when the determination by the main portion determining means indicates that one of the first and second images has a main portion outside its central region.

In the case where the main portion of each of the first and second images is located outside the central portion of each of the first and second images, the main portion undergoes a great influence of the wave front aberration exerted by the deviation of the optical axes of the image forming lenses from the optical axis of the objective lens. Hence, even if the distance between the first and second images is calculated on the basis of the main portion by the first calculating means and then, the amount of deviation of the image of the target object from the predetermined image forming plane is calculated on the basis of the calculation result of the first calculating means by the second calculating means, accurate focus detection cannot be performed.

However, in the present invention, the location of the main portion of at least one of the first and second images is determined in accordance with at least one of the first and second signals representative of the light intensity distributions of the first and second images by the main portion determining means and the correction means corrects one of the calculation results of the first and second calculating means when the main portion determining means determines that one of the first and second images has a main portion outside its central portion.

Accordingly, in accordance with the present invention, it becomes possible to perform accurate focus detection even when the main portion of each of the first and second images is located outside the central portion of each of the first and second images.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
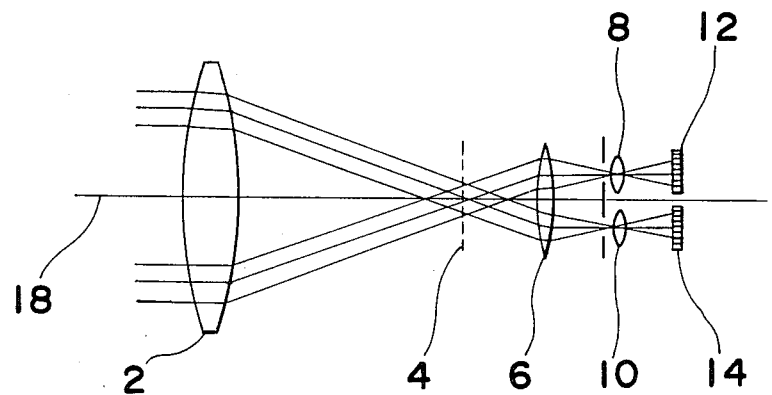
FIG. 1 is a view showing an optical system of a prior art focus detection device.
Figure 2:
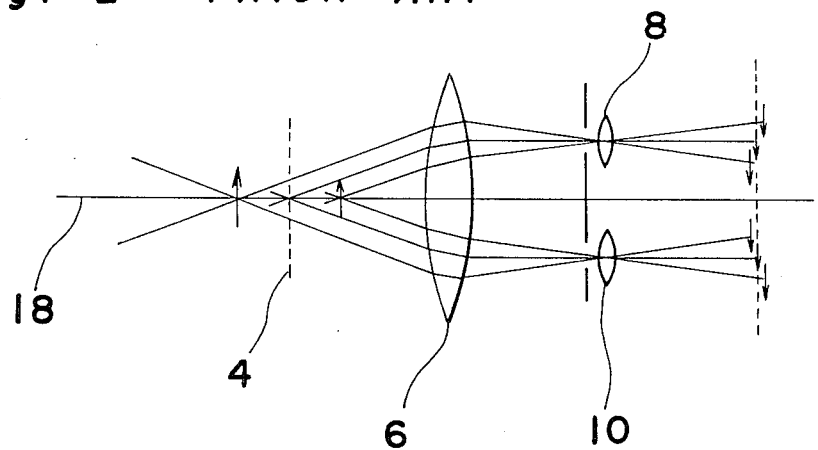
FIG. 2 is a view showing formation of images by the optical system of FIG. 1.
Figure 5:
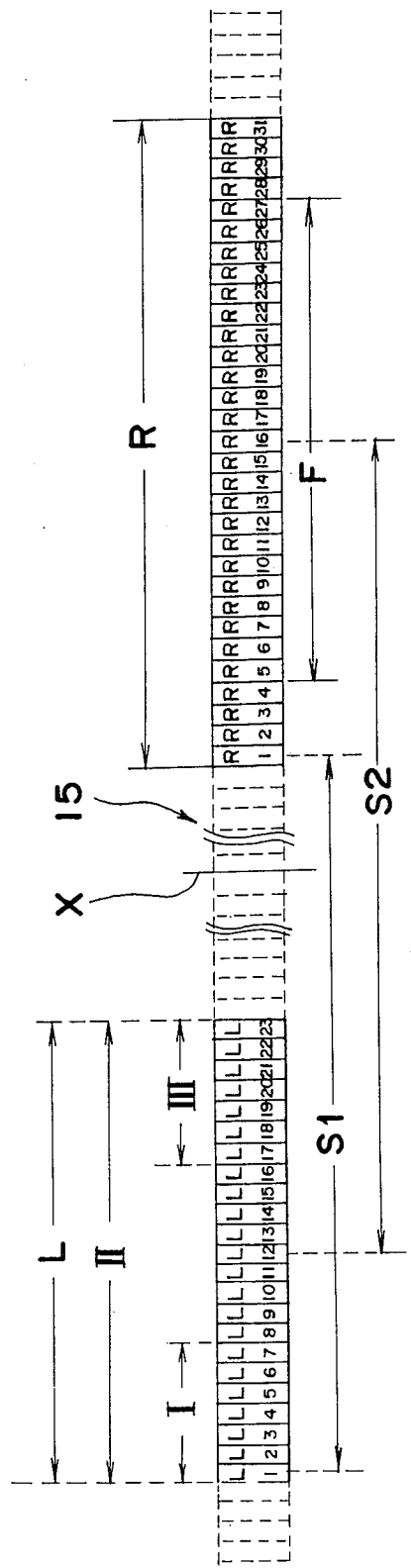
FIG. 5 is a top plan view of a line sensor employed in a focus detection device according to one preferred embodiment of the present invention.

Hereinbelow, a focus detection device according to one preferred embodiment of the present invention will be described with reference to FIGS. 5 to 9. It should be noted here that the prior art optical system of FIG. 1 is used as an optical system of the focus detection device of the present invention. However, in the present invention, a single line sensor 15 formed on a single semiconductor chip is divided into two regions acting as the line sensors 12 and 14 of the prior art optical system of FIG. 1, respectively as shown in FIG. 5. In FIG. 5, reference character X denotes a position through which the optical axis 18 of the objective lens 2 passes. Reference characters $L_1$ to $L_{23}$ denotes pixels belonging to a standard region L corresponding to the line sensor 12. The pixels $L_1$ to $L_7$, the pixels $L_1$ to $L_{23}$ and the pixels $L_{17}$ to $L_{23}$ constitute a first block I, a second block II and a third block III in the standard region L. The first block I and the third block III have seven pixels each, while the second block II has a whole number of the pixels of the standard region L, i.e. 23 pixels.

On the other hand, reference characters $R_1$ to $R_{31}$ denote pixels belonging to a reference region R corresponding to the line sensor 14. The reference region R has 31 pixels, the number being greater than that of the pixels of the standard region L by eight. A light sensing element (not shown) for monitoring illuminance on the pixels is provided above and adjacent to the standard region L as will be described later. Meanwhile, in FIG. 5, the pixel $L_1$, which is located farthest from the position X in the standard region L, and the pixel $R_1$, which is located closest to the position X in the reference region R, are assumed to be spaced a distance S1 from each other. The optical system of the present invention is designed such that when the objective lens is in an in-focus condition relative to the target object, namely when the image of the target object is formed on the predetermined image forming plane 4 by the objective lens 2, an image having an illuminance distribution identical with that of an image formed on the second block II of the standard region L is formed on the pixels $R_5$ to $R_{27}$ in the reference region R. The pixels $R_5$ to $R_{27}$ are designated as an in-focus block F in the reference region R. Meanwhile, reference character S2 denotes a distance between the pixel $L_{12}$, which is located at the center of the standard region L, and the pixel $R_{16}$, which is located at the center of the in-focus block F of the reference region R, i.e. a distance between the two images in the in-focus condition.

Figure 6:
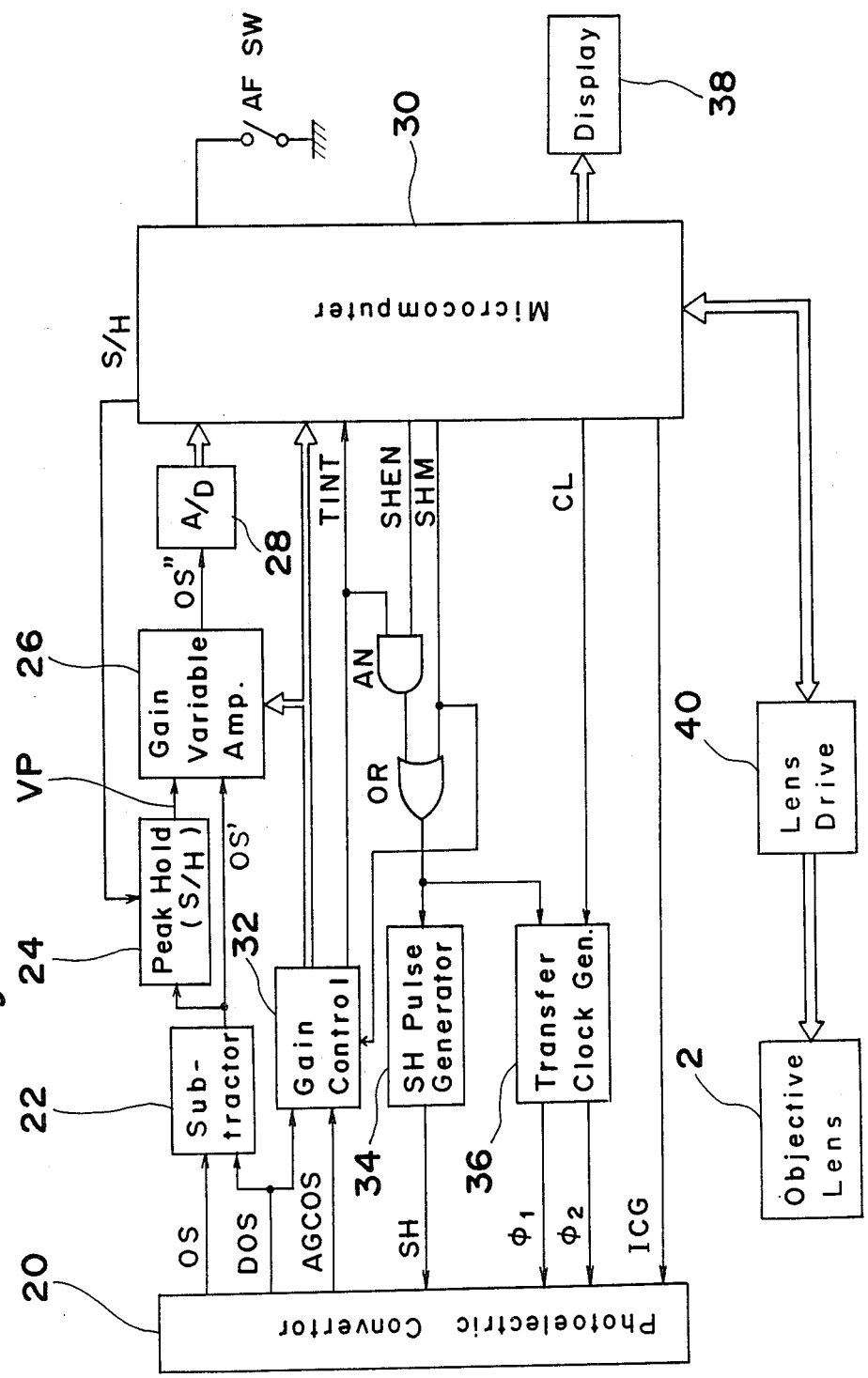
FIG. 6 is a block circuit diagram of the focus detection device according to the preferred embodiment.

FIG. 6 shows a circuit diagram of the focus detection device and an automatic focusing apparatus utilizing the same, in which a CCD image sensor is used as the line sensor 15 of FIG. 5. Reference numeral 20 denotes a photoelectric convertor section including the above described line sensor 15 and the monitoring light sensing element. The photoelectric convertor section 20 accepts such inputs as a shift pulse SH, transfer clocks $\phi 1$ and $\phi 2$ and a clear pulse ICG and provides such outputs as pixel signals OS in time sequence, a monitor output AGCOS and a reference voltage output DOS. The clear pulse ICG is a pulse used for initializing all of the pixels of the line sensor 15. When the pixels of the line sensor 15 have been initialized by the clear pulse ICG, the pixels discard accumulated electric charges and newly start light integration, i.e. accumulation of electric charges. By inputting the clear pulse ICG to the photoelectric convertor section 20, integration of the output of the monitoring light sensing element is also started in the photoelectric convertor circuit 20, so that the monitor output AGCOS changes relative to the reference voltage output DOS with the lapse of time at a speed dependent on brightness of the target object. The shift pulse SH shifts the accumulated electric charges from the respective pixels to a shift register in the line sensor 15 so as to terminate the light integration at the respective pixels of the line sensor 15 when applied to the photoelectric convertor section 20. The transfer clocks $\phi 1$ and $\phi 2$ are pulses having a phase shift of 180° so as to successively output the accumulated electric charges shifted to the shift register, from the shift register in time sequence. The accumulated electric charges outputted by the transfer clocks $\phi 1$ and $\phi 2$ are, respectively, converted into negative voltage signals in the photoelectric convertor section 20 and then, are outputted as the pixel signals OS.

Reference numeral 22 denotes a subtractor circuit for subtracting the reference voltage output DOS from each of the pixel signals OS and for outputting pixel signals OS' which are positive voltage signals. Reference numeral 24 denotes a peak hold circuit for sampling and holding the pixel signals OS' corresponding to some pixels shielded from light (for example, some pixels positioned leftwards of the pixel $L_1$ of the standard region L) to generate a voltage VP corresponding to a maximum value of these pixel signals OS'. Reference numeral 26 denotes a gain variable amplifier for amplifying the pixel signals OS' subtracted by the output voltage VP of the peak hold circuit 24. By the subtraction performed in the gain variable amplifier 26, a dark current component contained in each of the pixel signals OS' can be removed. Reference numeral 28 denotes an A/D convertor circuit for converting the voltage signals generated by the amplifier 26 into digital signals of predetermined bits, which are in turn fed to a microcomputer 30. Reference numeral 32 denotes a gain control circuit operable to detect amount of change of the monitor output AGCOS relative to the reference voltage output DOS. When the amount of such change has reached a predetermined threshold value in a predetermined time period from start of change of the monitor output AGCOS, namely when the target object is bright, the gain control circuit 26 not only outputs to the microcomputer 30 a signal TINT indicative of the reach but outputs a gain signal for setting the gain of the amplifier 26 to "x1". When the predetermined time period has elapsed after start of change of the monitor output AGCOS, a compulsory shift signal SHM is produced by the microcomputer 30 so as to be fed to the gain control circuit 32, causing the gain control circuit 32 to generate a gain signal for setting the gain of the amplifier 26 to "x1", "x2", "x4" or "x8" depending on the amount of change of the monitor output AGCOS relative to the reference voltage output DOS, which change has taken place till a point of time of input of the compulsory shift signal SHM to the gain control circuit 32. In this case, as the amount of change of the monitor output AGCOS relative to the reference voltage output DOS becomes smaller, the amplifier 26 is set to a larger gain.

Reference characters AN and OR denote an AND gate and an OR gate, respectively. The AND gate AN receives the above mentioned signal TINT from the gain control circuit 32 and a signal SHEN from the microcomputer 30, while the OR gate OR receives an output signal from the AND gate AN and the above mentioned compulsory shift signal SHM from the microcomputer 30. The signal SHEN from the microcomputer 30 is a signal for enabling a shift pulse generator circuit 34 to generate the shift pulse SH. This signal SHEN remains in a "Low" state during a time period in which generation of the shift pulse SH should be inhibited (for example, during data dumping from the photoelectric convertor section 20 to the microcomputer 30 and during data calculation performed in the microcomputer 30), but assumes a "High" state subsequently so as to enable the AND gate AN. When the signal TINT is generated while the signal SHEN is in the "High" state, the AND gate outputs the "High" signal TINT. The OR gate OR applies this signal TINT or the signal SHM to the shift pulse generator circuit 34 which in turn generates the shift pulse SH. Reference numeral 36 denotes a transfer clock generator circuit for generating the transfer clocks $\phi 1$ and $\phi 2$ in response to clock pulses CL applied thereto from the microcomputer 30. When the signal TINT or the signal SHM is applied from the OR gate OR to the transfer clock generator circuit 36, the transfer clock generator circuit 36 is reset to an initial state and newly starts generation of the transfer clocks $\phi 1$ and $\phi 2$ regardless of phases of the previous transfer clocks $\phi 1$ and $\phi 2$ so as to synchronize the shift pulse SH with the transfer clocks $\phi 1$ and $\phi 2$. The microcomputer 30 generates a sample hold signal S/H for specifying the pixel signals OS' to be received by the peak hold circuit 24.

The microcomputer 30 is electrically connected to a display circuit 38 and a lens drive unit 40. The microcomputer 30 causes the display circuit 38 to display the focus condition of the objective lens 2 determined by calculation to be described later and, at the same time, causes the lens drive unit 40 to drive the objective lens 2 for focusing. In this embodiment, the focus condition of the objective lens 2 determined by calculation in the microcomputer 30 is expressed by a defocus amount and a defocus direction. Thus, the defocus amount and the defocus direction determine the amount and the direction of drive of the lens drive unit 40 for displacing the objective lens 2 to an in-focus position. The lens drive unit 40 drives the objective lens 2 by such amount of drive in such direction of drive and also outputs to the microcomputer 30, a signal indicative of the amount of drive of the lens drive unit 40 actually performed. The microcomputer 30 outputs to the lens drive unit 40, a signal for stopping drive of the lens drive unit 40 when the actual amount of drive of the lens drive unit 40 has reached a value equal to the calculated amount of drive of the lens drive unit 40. Meanwhile, in FIG. 6, reference character AFSW denotes a start switch for applying to the microcomputer 30, a start signal for starting the focus detection and automatic focus adjustment based on the deviation detection.

Hereinbelow, operations of the microcomputer 30 will be described with reference to flow charts of FIGS. 7 to 9. When a power source switch (not shown) is turned on, the program flow of FIG. 7 starts. At step s1, a decision is made as to whether or not the start switch AFSW has been turned on. In the case of "YES" at step s1, the microcomputer 30 generates, at step s2, the clear pulse ICG which causes all of the pixels of the line sensor 15 to start light integration after initializing all of the pixels of the line sensor 15. At this time, a monitor circuit in the photoelectric convertor section 20 also starts integration of the output of the monitoring light sensing element and the monitor output AGCOS starts change as described earlier. Subsequently, when the gain control circuit 32 generates the signal TINT, the shift pulse generator circuit 36 generates the shift pulse SH in response thereto. Meanwhile, when the predetermined time period has elapsed after start of light integration without generation of the signal TINT because the target object is dark, the microcomputer 30 generates the signal SHM and the shift pulse generator circuit 34 generates the shift pulse SH in response thereto. As a result, the light integration at step s2 terminates and the pixel signals OS are outputted in time sequence from the photoelectric convertor circuit 20. At step s3, the microcomputer 30 receives the pixel signals OS" which have been digitalized in the A/D convertor circuit 28, namely data dumping is performed. Then, at step s4, the microcomputer performs calculation for focus detection (FIG. 8) to be described later. Thereafter, at step s5, a decision is made as to whether or not focus detection is possible as will be described later in FIG. 8. In the case of "NO" at step s5, the program flow returns to step s2 at which the light integration is performed again. On the contrary, in the case of "YES" at step s5, a defocus amount DF is calculated at step s6 on the basis of the calculation result of step s4. Subsequently, at step s7, a decision is made as to whether or not the defocus amount DF falls within a predetermined range. In the case of "YES" at step s7, the microcomputer 30 causes the display circuit 38 to perform in-focus display at step s9. On the other hand, in the case of "NO" at step s7, the objective lens 2 is driven by the lens drive unit 40 at step s8 and then, the program flow returns to step s2 at which the light integration is performed again.

Figure 8A:
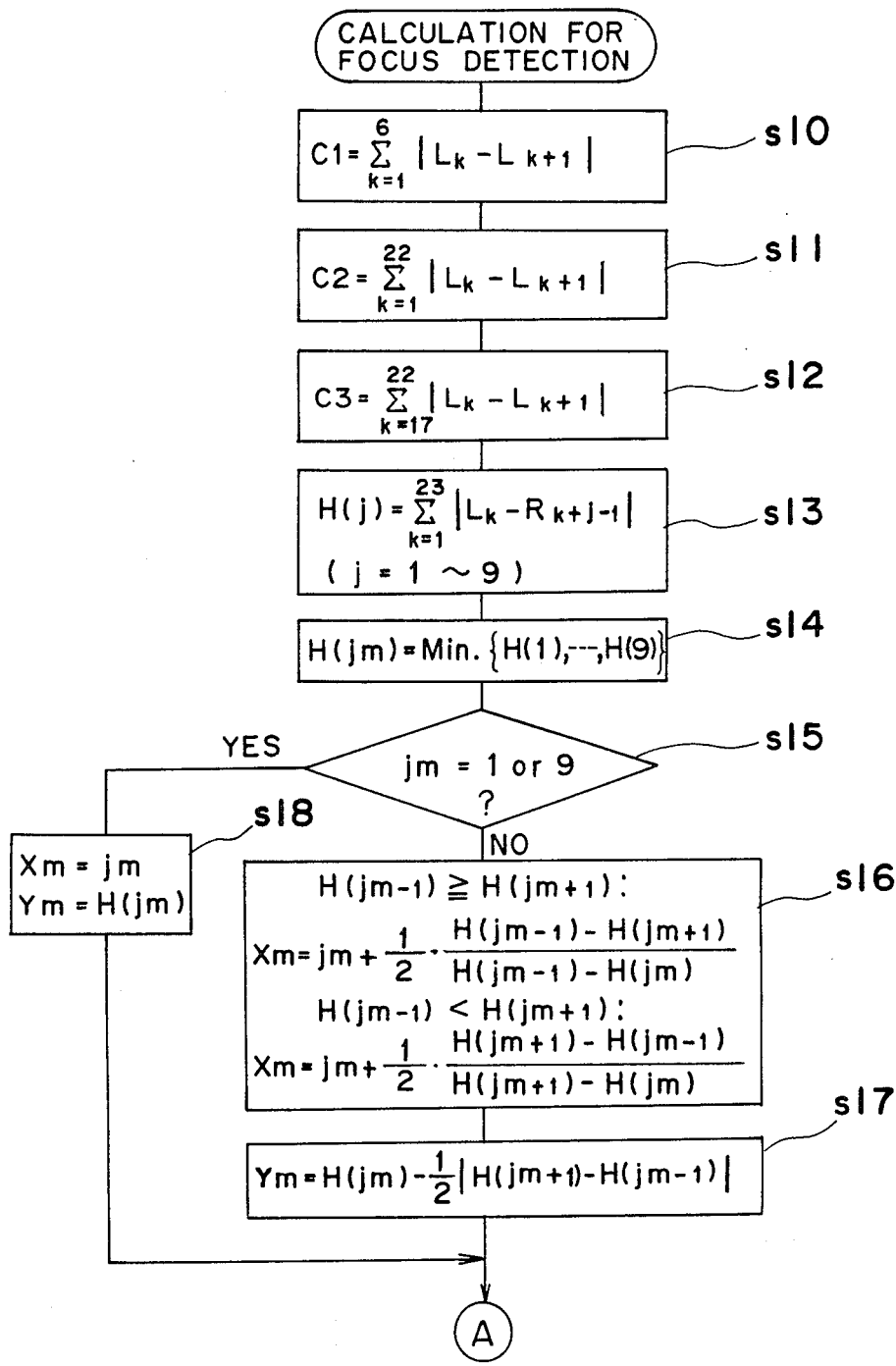
Figure 8B:
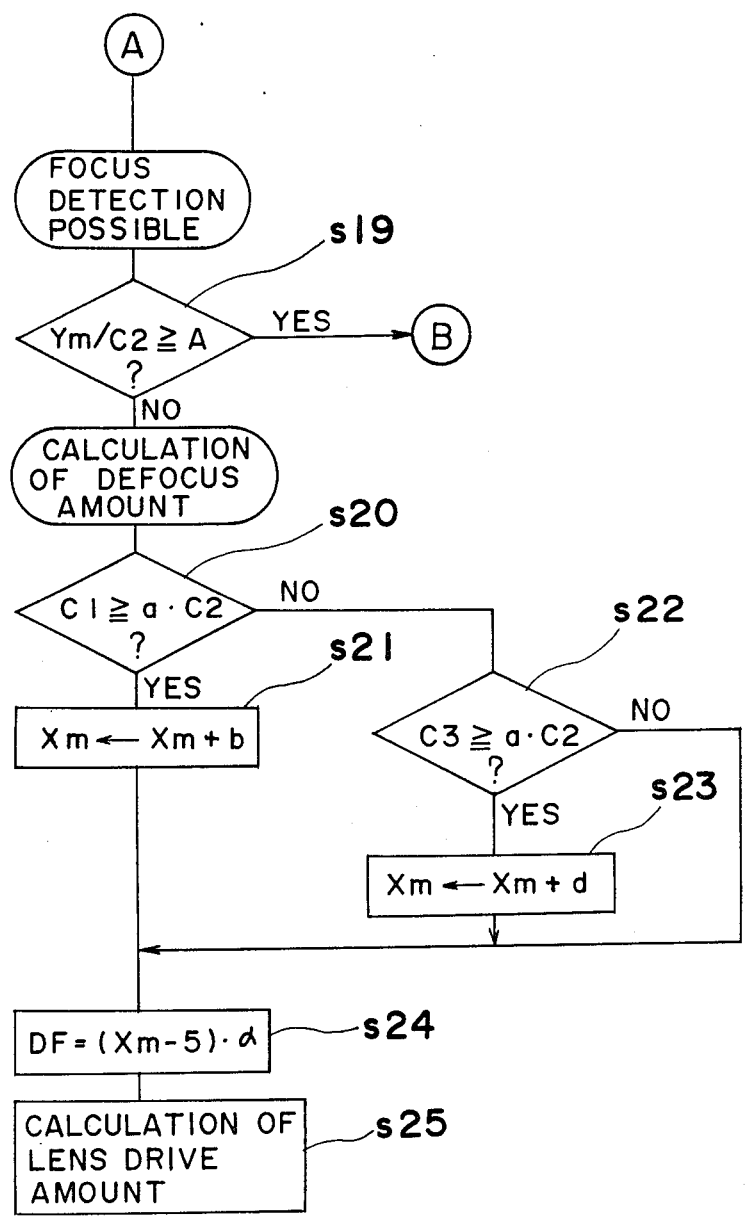

FIGS. 8a and 8b show details of steps 4, 5 and 6. When the program flow proceeds to step s4 after the microcomputer 30 has received the digitalized pixel signals OS" at step s3, the microcomputer 30 calculates contrasts C1, C2 and C3 of the images on the first, second and third blocks I, II and III of the standard region L of the line sensor 15 by using the following equations (1) to (3).

$$C1 = \sum_{k=1}^{6} |L_k - L_{k+1}| \qquad (1)$$

$$C2 = \sum_{k=1}^{22} |L_k - L_{k+1}| \qquad (2)$$

$$C3 = \sum_{k=17}^{22} |L_k - L_{k+1}| \qquad (3)$$

Subsequently, at step s13, 9 correlative values H(1), H(2), ---, H(8), H(9) are sequentially calculated by using the following equation (4) through change of j from 1 to 9.

$$H(j) = \sum_{k=1}^{23} |L_k - R_{k+j-1}| \qquad (4)$$

Then, at step s14, a minimum correlative value H(jm) indicative of a maximum correlative degree among the correlative values H(1) to H(9) is determined among the correlative values H(1) to H(9) and, at the same time, a shift position jm is determined. It is to be noted that $L_k$ and $R_k$ in the above equations (1) to (4) represent the digitalized pixel signals OS" corresponding to the k-th pixels in the standard region L and the reference region R, respectively for convenience. Meanwhile, $L_{sk}=L_k-L_{k+m}$ and $R_{sk}=R_k-R_{k+m}$ may be substituted for $L_k$ and $R_k$, respectively in the equations (1) to (4).

Subsequent steps s15 to s17 are steps for determining a minimum correlative value (maximum correlative degree) and a shift position therefor more accurately than the pitch of the pixels of the line sensor 15. Initially, at step s15, a decision is made as to whether or not the value of the shift position jm leading to the minimum correlative value is 1 or 9. In the case of "NO" at step s15, calculation is performed by interpolation at step s16. In this interpolation, correlative values H(jm−1) and (jm+1) of the shift position jm are compared with each other and either of the following equations (5) and (6) is used in accordance with the comparison.

$$H(jm - 1) \geq H(jm + 1):$$

$$Xm = jm + \frac{1}{2} \times \frac{H(jm - 1) - H(jm + 1)}{H(jm - 1) - H(jm)} \qquad (5)$$

$$H(jm - 1) < H(jm + 1):$$

$$Xm = jm + \frac{1}{2} \times \frac{H(jm + 1) - H(jm - 1)}{H(jm + 1) - H(jm)} \qquad (6)$$

In the above equations (5) and (6), Xm denotes the shift position having the maximum correlative degree, which has been calculated by interpolation. At step s17, the correlative value at this shift position having the maximum correlative degree, i.e. the minimum correlative value (maximum correlative degree) Ym based on calculation of interpolation is obtained by the following equation (7).

$$Ym = H(jm) - \tfrac{1}{2}|H(jm+1) - H(jm-1)| \qquad (7)$$

Meanwhile, in the case of "YES" at step s15, the above described calculation of interpolation cannot be performed due to absence of the correlative values H(jm−1) and H(jm+1) and thus, the program flow proceeds to step s18 at which the value of the shift position jm and the minimum correlative value H(jm) are, respectively, set as the value of the shift position Xm having the maximum correlative degree and the minimum correlative value Ym.

Step s19 is one example of step s5 (FIG. 7) for making a decision as to whether or not focus detection is possible. At step s19, a decision is made as to whether or not a value of (Ym / C2), into which the minimum correlative value Ym based on the calculation of interpolation is normalized by the value of the contrast C2 of the image on the second block II of the standard region L of the line sensor 15, is not less than a predetermined value A. Namely, the minimum correlative value is reduced further as the correlative degree rises higher. By eliminating influence of the contrast from the minimum correlative value Ym, (Ym / C2) is obtained. If the value of (Ym / C2) is not less than the predetermined value A, the correlative degree is low, thereby resulting in unreliable focus detection. Hence, in the case of "YES" at step s19, it is determined that focus detection is impossible and thus, the program flow returns to step s2 (FIG. 7) at which the next light integration is performed. On the other hand, in the case of "NO" at step s19, the defocus amount DF is calculated at steps s20 to s24 corresponding to step s6 of FIG. 7. Then, at step s25, the amount of drive of the lens drive unit 40 for displacing the objective lens 2 to an in-focus position is calculated from the defocus amount DF.

Figure 3A:
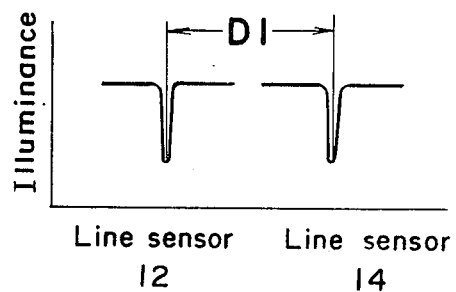
FIGS. 3a, 3b and 3c are diagrams showing, in the case of formation of a dark slit image on a predetermined image forming plane of the optical system of FIG. 1, change of positions of two optical images on line sensors in response to difference in change of position of the slit image relative to an optical axis of the optical system of FIG. 1.
Figure 3B:
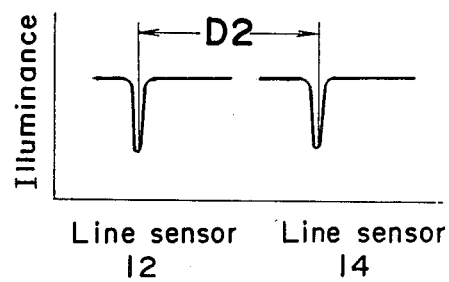
Figure 3C:
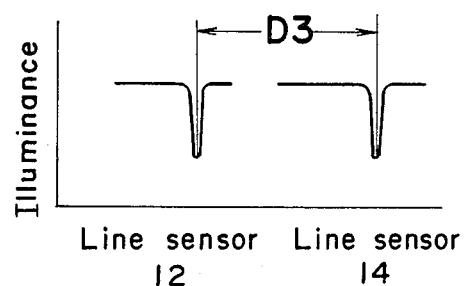
Figure 4:
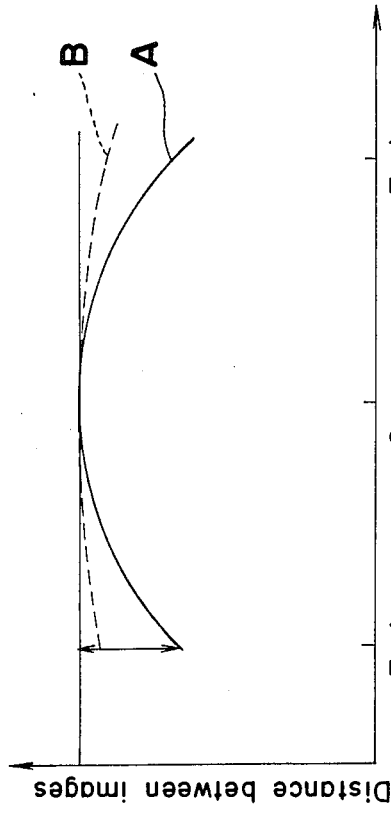
FIG. 4 is a diagram showing relation between position of one of the optical images on a corresponding one of the line sensors and distance between the optical images.

Referring to steps s20 to s24, the contrasts C1 and C2 of the images on the first and second blocks I and II of the standard region L of the line sensor 15 are compared with each other at step s20. Namely, a decision is made at step s20 as to whether or not the contrast C1 is not less than a value of (a×C2) in which reference character a denotes a predetermined constant not more than 1. The constant a may usually assume a value of 0.6 or so. In the case of "YES" at step s20, the contrast C1 of the image on the first block I, i.e. the contrast of one peripheral portion of the image of the standard region L is higher, at the ratio of the constant a or more, than the contrast C2 of the image on the second block II, i.e. the whole contrast of the image on the standard region L. At this time, the main portion of the image on the standard region L deviates towards the one peripheral portion of the standard region L, which is subjected to a large influence of wave front aberration such as distortion. It may be concluded that this case is approximately identical with a case in which the dark slit image is positioned adjacent to one end portion of the standard region L as shown in FIG. 3b. Thereafter, at step s21, a predetermined correction value b is added to the shift position Xm having the maximum correlative degree, which is obtained at step s16, such that a value of (Xm+b) is newly set as the shift position Xm having the maximum correlative degree. Then, the program flow proceeds to step s24. On the other hand, in the case of "NO" at step s20, a decision is made at step s22 as to whether or not an equation (C3≧a×C2) is satisfied. In the case of "YES" at step s22, the contrast C3 of the image on the third block III, i.e. the contrast of the other peripheral portion of the image on the standard region L is higher, at the ratio of the constant a or more, than the contrast C2 of the image of the second block II. At this time, the main portion of the image deviates towards the other peripheral portion of the standard region L, which is subjected to a large influence of wave front aberration such as distortion. It may be considered that this case is approximately identical with a a case in which the dark slit image is positioned adjacent to the other end portion of the standard region L as shown in FIG. 3c. Subsequently, at step s23, a predetermined correction value d is added to the shift position Xm having the maximum correlative degree, which is obtained at step s16, such that a value of (Xm+d) is newly set as the shift position Xm having the maximum correlative degree. Then, the program flow proceeds to step s24. In the case where the numbers of the pixels in the first and third blocks I and III of the standard region L are so set as to be identical with each other as shown in FIG. 5, the correction values b and d become equal to each other. On the other hand, in the case where the numbers of the pixels in the first and third blocks I and III are so set as to be different from each other, the correction values b and d also become different from each other. Meanwhile, in the case of "NO" at step s22, the contrast of the image on the reference region L has no deviation and thus, the program flow proceeds to step s24 without correction of the shift position Xm having the maximum correlative degree. At step s24, the defocus amount DF is calculated by using the following equation (8).

$$DF = (Xm - 5) \times \alpha \tag{8}$$

In the above equation (8), reference numeral $\alpha$ denotes a constant determined by design conditions of the optical system for focus detection. It is to be noted that the objective lens 2 is in the in-focus condition relative to the target object at the time of (Xm=jm=5). At this time, the distance between the image on the standard region L and the image on the reference region R is S2 in FIG. 5. Thereafter, at step s25, the amount of drive of the lens drive unit 40 necessary for displacing the objective lens 2 to the in-focus position, for example, the number of revolutions of a motor of the lens drive unit 40 is calculated from specific data of the objective lens 2 and the defocus amount DF obtained at step s24.

Assuming that reference character S denotes a distance between the image on the standard region R and the image on the reference region R and reference character P denotes a pitch of the pixels of the line sensor, the distance S is given by the following equation (9).

$$S = (Xm - 5) \times P + S2 \tag{9}$$

Therefore, the value of the shift position Xm having the maximum correlative degree represents the distance S indirectly. Accordingly, in the program flow of calculation of defocus amount in FIG. 8, the distance L is corrected in the case where the contrast of the peripheral portion of the image on the standard region L is higher, at the predetermined ratio or more, than the whole contrast of the image on the standard region L. However, in the same manner as in the program flow of calculation of the defocus amount DF in FIG. 9, it can also be so arranged in FIG. 8 that the defocus amount DF (=(Xm−5)×α) is preliminarily obtained and then, the defocus amount DF is corrected if it is found that equations (C1≧a×C2) and (C3≧a×C2) are satisfied.

Figure 7:
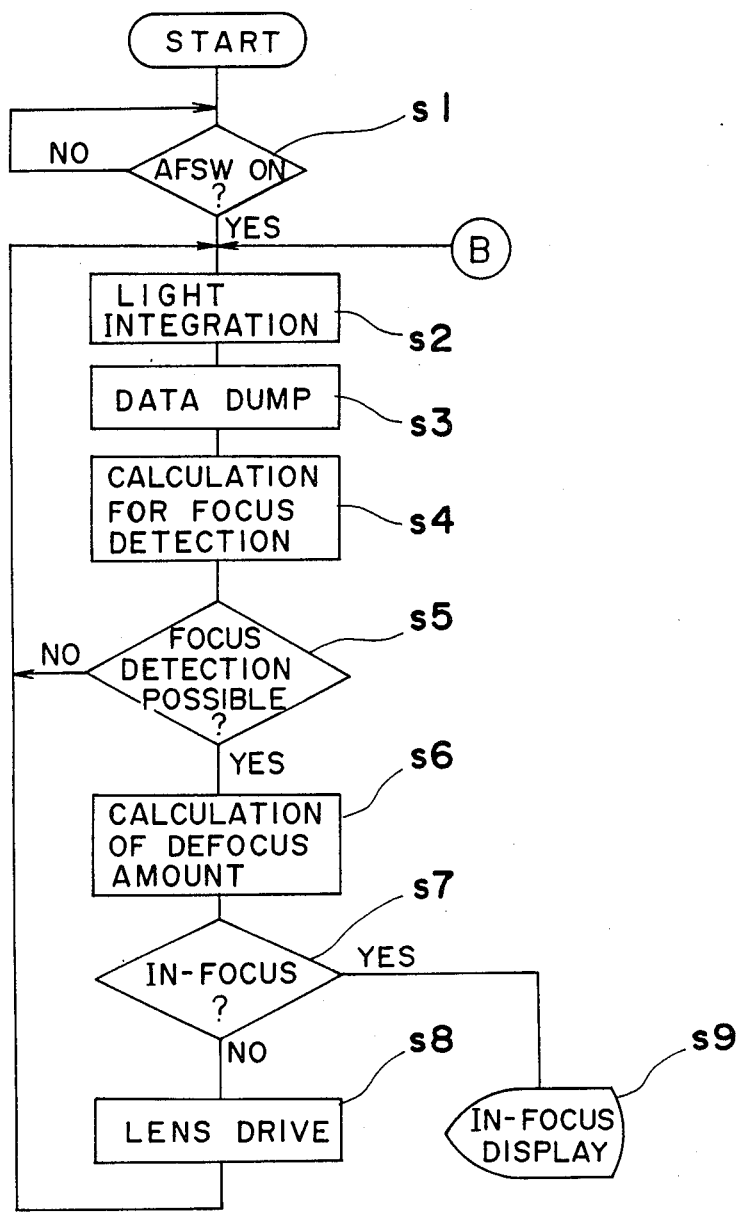
FIGS. 7, 8a, 8b and 9 are flow charts showing processing sequences of a microcomputer employed in the circuit of FIG. 6.
Figure 9:
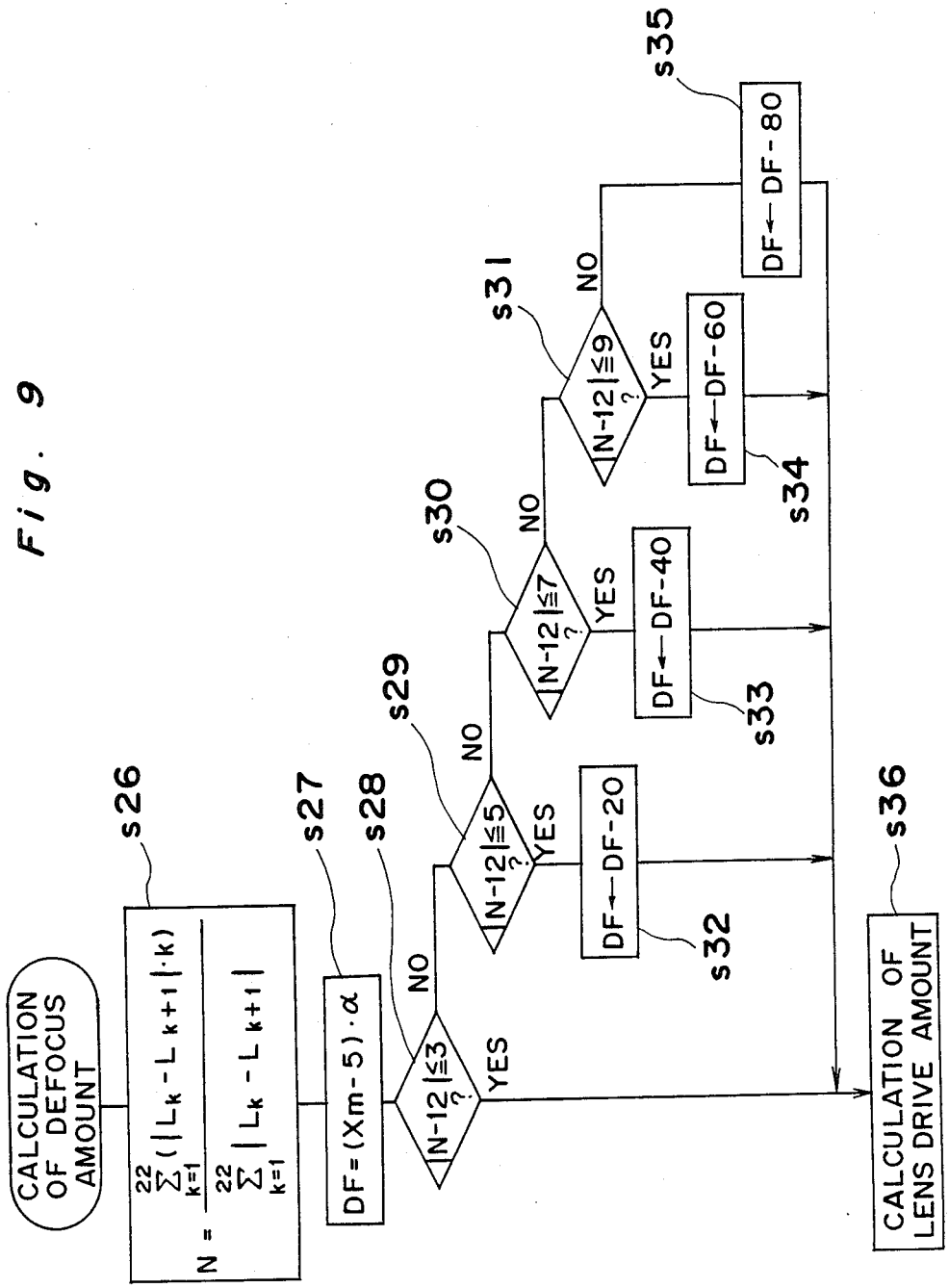

FIG. 9 shows another concrete example of step s6 for calculation of the defocus amount DF in FIG. 7. In FIG. 9, a gravitational center N of the contrast distribution of the image on the standard region L is calculated at step s26. The microcomputer 30 performs this calculation by using the following equation (10).

$$N = \sum_{k=1}^{22} (|L_k - L_{k+1}| \times k) / \sum_{k=1}^{22} |L_k - L_{k+1}| \quad (10)$$

Subsequently, at step s27, the defocus amount DF $(=(Xm-5)\times a)$ is obtained. Subsequently, at steps s28 to s31, the gravitational center N is determined and then, the defocus amount DF is corrected in accordance with the result of the determination of the gravitational center N. Namely, since an amount f(N) of variation of the distance between the images, which is produced by wave front aberration such as distortion, is distributed symmetrically with respect to the gravitational center N, i.e. the pixel L12 of the standard region L, the following equation (11) is satisfied.

$$f(N) \propto |N-12| \text{TM} \quad (11)$$

Thus, the amount f(N) corresponding to $(|N-12|)$ is preliminarily stored in a read-only memory (ROM) of the microcomputer 30 and is read from the ROM in accordance with the result of the determination of the gravitational center N so as to be used as a correction value. Table 1 below shows one example of the correction value.

TABLE 1

| N − 12 | 0 | 1 | 2 | 3 | 4 | 5 | 6 | 7 | 8 | 9 | 10 | 11 |
|---|---|---|---|---|---|---|---|---|---|---|---|---|
| Correction value (μm) | 0 | 0 | 0 | 0 | — | −20 | −40 | −40 | −60 | −60 | −80 | −80 |

Correction of the defocus amount DF is performed as follows. At step s28, a decision is made as to whether or not an equation $(|N-12| \leq 3)$ is satisfied. In the case of "YES" at step s28, the defocus amount DF is not corrected and the program flow proceeds to step s36 at which the amount of drive of the lens drive unit 40 necessary for displacing the objective lens 2 to the in-focus position is calculated from specific data of objective lens 2 and the defocus amount DF obtained at step s27. Meanwhile, in the case of "NO" at step s28, a decision is made at step s29 as to whether or not an equation $(|N-12| \leq 5)$ is satisfied. In the case of "YES" at step s29, a value of (DF−20) obtained by subtracting 20 μm from the defocus amount DF is newly set as the defocus amount DF at step s32 leading to step s36. On the other hand, in the case of "NO" at step s29, a decision is made at step s30 as to whether or not an equation $(|N-12| \leq 7)$ is satisfied. In the case of "YES" at step s30, a value of (DF−40) obtained by subtracting 40 μm from the defocus amount DF is newly set as the defocus amount DF at step s33 leading to step s36. Similarly, in the case of "NO" at step s30, a decision is made at step s31 as to whether or not an equation $(|N-12| \leq 9)$ is satisfied. In the case of "YES" at step s31, a value of (DF−60) is newly set as the defocus amount DF at step s34 leading to step s36. In the case of "NO" at step s31, a value of (DF−80) is newly set as the defocus amount DF at step s35 leading to step s36.

In the program flow of FIG. 9 for calculation of the defocus amount DF, the gravitational center of the contrast distribution of the image on the standard region L is arranged to fall within one of five ranges divided at each of opposite sides of the gravitational center of the standard region L and the defocus amount DF is corrected by the correction values corresponding to the respective ranges. However, the number of the ranges may be increased or decreased as necessary. If the number of the ranges is increased and the correction values corresponding to the ranges, respectively are set, it becomes possible to correct the defocus amount DF more accurately.

Although one embodiment of the present invention has been described with reference to the drawings so far, it is needless to say that the present invention can be modified variously. For example, since the image associated with the image on the standard region L is also formed on the reference region R, it can also be arranged that the ratio of the contrast of one peripheral portion of the image to the whole contrast of the image or the gravitational center of the contrast distribution is obtained for the image on the reference region R in place of the image on the standard region L and then, the main portion of the image on the reference region R is determined. Meanwhile, since the calculation of interpolation at steps s15 to s17 of FIG. 8a is to be performed in accordance with accuracy required for the calculation of the defocus amount, the shift position jm obtained at step s14 may be directly used for the calculation of the defocus amount. Furthermore, although the condenser lens 6 is a spherical lens in the above described embodiment, the present invention can be applied to even a case in which even if the condenser lens is constituted by an aspherical lens, wave front aberration still occurs and affects the two images on the standard region and the reference region.

The wave front aberration affecting the two images formed on the line sensor includes, in addition to distortion especially, curvature of field, astigmatism and comatic aberration.

As is clear from the foregoing description, in the focus detection device of the present invention, the first and second images are, respectively, formed on the first and second image sensors for generating the first and second signals representative of the illuminance distributions of the first and second images and the main portion of one of the first and second images is determined on the basis of one of the first and second signals such that the distance between the first and second images or the defocus amount based on the distance between the first and second images is corrected when the main portion of one of the first and second images is located outside its central region.

Accordingly, in accordance with the present invention, focus detection can be performed accurately without being affected by wave front aberration.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. A focus detection device comprising:
   a focus adjustable objective lens for forming an image of an object;

first and second image forming lenses arranged symmetrically with one another with respect to the optical axis of said objective lens for forming first and second images of said image of the object in such a manner that the distance between the first and second images in the direction perpendicular to the optical axis of said objective lens varies with the focus condition of said objective lens, said first and second images being subjected to wave front aberration;

first and second image sensors for sensing said first and second images to generate first and second signals representative of the light intensity distributions of said first and second images, respectively;

first calculating means for calculating the distance between said first and second images sensed by said first and second image sensors in accordance with said first and second signals;

second calculating means for calculating the amount of deviation of said image relative to a predetermined focal plane of said objective lens in accordance with the distance calculated by said first calculating means;

main portion determining means for determining the location of a main portion of at least said first image in accordance with said first signal; and correction means for correcting one of the calculation results obtained by said first and second calculating means so as to lessen an error involved therein owing to said wave front aberration when the determination by said main portion determining means indicates that said first image has a main portion outside its central region.

2. A focus detection device as claimed in claim 1, wherein said main portion determining means comprises:

third calculating means for calculating contrast values of a peripheral region and the whole region of said first image sensed by said first image sensor in accordance with said first signal; and contrast ratio determining means for determining whether or not the contrast value of the peripheral region of said first image divided by the contrast value of the whole region of said first image is higher than a given value;

wherein said main portion determining means is arranged to determine that said first image has a main portion outside its central portion when the determination by said contrast ratio determining means indicates that the contrast value of the peripheral region of said first image divided by the contrast value of the whole region of said first image is higher than the given value.

3. A focus detection device as claimed in claim 1, wherein said main portion determining means comprises:

third calculating means for calculating the center of gravity of the contrast distribution of said first image sensed by said first image sensor; and center-of-gravity determining means for determining the location of the center of gravity calculated by said third calculating means relative to said first image;

wherein said main portion determining means is arranged to determine that said first image has a main portion outside its central region when the determination by said center-of-gravity determining means indicates that the location of the center of gravity is outside the central region of said first image.

4. A focus detection device as claimed in claim 3, wherein said first image sensor is constituted by m photodetectors on the assumption that m denotes a natural number and said first signal is composed of outputs of said m photodetectors such that said third calculating means calculates the center of gravity by using the following equation:

$$N = \sum_{k=1}^{m-1} (|L_k - L_{k+1}| \times k) / \sum_{k=1}^{m-1} |L_k - L_{k+1}|$$

where N denotes the center of gravity and $L_k$ and $L_{k+1}$ denote outputs of k−th and (k+1)-th ones of said photodetectors, respectively.

* * * * *